United States Patent [19]
Ilardi et al.

[11] 3,933,977
[45] Jan. 20, 1976

[54] PROCESS FOR PRODUCING SODIUM CARBONATE

[75] Inventors: Joseph M. Ilardi, Kendall Park; John Walden, Hightstown; Eric Rau, Trenton, all of N.J.

[73] Assignee: Intermountain Research and Development Corporation, Greenriver, Wyo.

[22] Filed: Jan. 11, 1974

[21] Appl. No.: 432,467

[52] U.S. Cl............. 423/206 T; 423/302; 423/421
[51] Int. Cl.².... C01D 7/12; C01D 7/24; C01D 7/40
[58] Field of Search............ 423/206 T, 421; 23/302

[56] References Cited
UNITED STATES PATENTS

| | | |
|---|---|---|
| 2,770,524 | 11/1956 | Seaton et al. ................ 423/206 T |
| 2,780,520 | 2/1957 | Pike ............................. 423/206 T |
| 2,792,282 | 5/1957 | Pike ............................. 423/206 T |
| 3,233,983 | 2/1966 | Bauer et al. .................. 423/206 T |
| 3,628,919 | 12/1971 | Beauchamp et al. ......... 423/206 T |
| 3,653,848 | 4/1972 | Port et al. .................... 423/206 T |

Primary Examiner—Earl C. Thomas
Assistant Examiner—Gary P. Straub

[57] ABSTRACT

This invention involves a process for producing high bulk density sodium carbonate from crude trona wherein sodium carbonate monohydrate purge streams containing high amounts of organic impurities are passed to an anhydrous crystallizer operated at temperatures above about 109°C wherein anhydrous sodium carbonate crystals are formed having high bulk densities of about 60 to about 80 lbs/ft³.

7 Claims, 2 Drawing Figures

PROCESS FOR PRODUCING SODIUM CARBONATE

This invention relates to an improved process for the production of sodium carbonate (soda ash) from crude trona.

In Sweetwater and adjacent counties in the vicinity of Green River, Wyoming, trona deposits are found at depths ranging from about 800 to about 1800 feet underground. The main trona bed varies from 8 to 18 feet in thickness and other beds of less thickness separated by layers of shale are usually found above the main trona bed. The trona consists mainly of sodium sesquicarbonate ($Na_2CO_3 \cdot NaHCO_3 \cdot 2H_2O$) and four to six percent insoluble materials consisting mainly of shale. A typical analysis of the crude trona from which the larger pieces of shale have been removed is:

| Constituent | Percent |
| --- | --- |
| $Na_2CO_3$ | 43.50 |
| $NaHCO_3$ | 36.11 |
| $H_2O$ | 13.14 |
| $Na_2SO_4$ | 0.02 |
| NaCl | 0.09 |
| $Fe_2O_3$ | 0.14 |
| Organic Matter | 0.30 |
| Insolubles | 6.70 |

Various processes for the production of sodium carbonate from crude trona are known. One such process is the monohydrate process, disclosed in U.S. Pat. No. 2,962,348 issued to Seglin et al on Nov. 29, 1960. In this process, crude trona, after being crushed and screened, is calcined directly to form crude sodium carbonate. The crude sodium carbonate is dissolved in an aqueous solvent to form a substantially saturated solution of crude sodium carbonate. The crude sodium carbonate solution is then clarified and/or filtered to remove insolubles and subsequently crystallized, preferably in evaporative crystallizers to form sodium carbonate monohydrate. The monohydrate crystals are then calcined to produce a dense soda ash.

One difficulty that has arisen in the operation of the monohydrate process has been the build-up of soluble organic impurities in the crude sodium carbonate solution during crystallization of the sodium carbonate. These organic impurities consists mainly of kerogenaceous material such as carboxylic acids and rosin acids present in the trona as well as conventionally added organic surface active agents which are used to assist in the crystallization process. The presence of appreciable amounts of the organic impurities, that is above about 300 ppm carbon based on the sodium carbonate solution during crystallization must be avoided. These amounts of carbon adversely affect sodium carbonate monohydrate crystal quality by discoloring the crystals, by producing crystals of unacceptably low bulk density, and by forming elongated crystals which cannot be handled easily. Furthermore, crystal quality becomes increasingly worse as the organic impurity concentration increases.

A subsequent modification of the monohydrate process involved the installation of carbon towers to treat the clarified sodium carbonate solution with activated carbon prior to and after crystallization in order to remove a substantial portion of the soluble organic impurities. This process, however, has not been effective in continuously maintaining the organic impurity concentration below about 300 ppm carbon based on the sodium carbonate solution during crystallization in continuous crystallization processes requiring recycle. In such processes the mother liquor containing high amounts of organic impurities, separated from the sodium carbonate monohydrate crystals, is recycled to the evaporative crystallizers.

Various processes have been proposed to lower the soluble organic impurity concentration of the sodium carbonate solution during evaporative crystallization. One such method is proposed in British Pat. No. 1,211,984 wherein the effect of the organic impurities upon sodium carbonate crystallization is reduced by growing sodium carbonate crystals at one crystallization temperature and then feeding separated mother liquor which has an increased organic impurity concentration relative to the initial feed liquor to another crystallizer operated at a higher temperature. When the organic carbon level of the liquor is between 300 ppm carbon and 5,000 ppm carbon calculated on a sodium carbonate basis, a portion of the liquor is purged from the crystallizers and discharged as waste. Purging in this manner reduces the concentration of organic impurities in the crystallizers to an acceptable level. This process, however, results in a substantial loss of valuable carbonate values present in the discarded purge stream; these discarded carbonate values can be as high as 30 percent of the carbonate values present in the feed liquor.

It has been unexpectedly discovered that substantial amounts of the discarded sodium carbonate values which cannot be recovered as sodium carbonate monohydrate crystals, can be recovered from sodium carbonate liquors containing as high as 4,000 ppm carbon based on the sodium carbonate solution as excellent quality, high bulk density anhydrous sodium carbonate crystals. It has also been unexpectedly discovered that the anhydrous sodium carbonate crystals recovered according to this invention can be combined with the sodium carbonate monohydrate crystals produced according to the monohydrate process to produce a commercially saleable, non-segregating, high bulk density sodium carbonate product.

The improved process according to the invention is an improvement in carrying out the monohydrate process wherein crude trona is calcined at a temperature and for a time sufficient to convert the crude trona into crude sodium carbonate, the crude sodium carbonate is dissolved in water to form an aqueous solution of crude sodium carbonate containing suspended solids and soluble organic impurities, the coarse suspended insolubles are separated from the crude sodium carbonate solution, the crude sodium carbonate solution is clarified and treated to remove a substantial portion of the remaining suspended insolubles and soluble organic impurities from the crude sodium carbonate solution, a portion of water from the clarified sodium carbonate solution is evaporated in a monohydrate crystallizer and sodium carbonate monohydrate crystals are formed, the sodium carbonate monohydrate crystals are separated from the monohydrate crystallizer liquor containing organic impurities, and the separated sodium carbonate monohydrate crystals are calcined to form dense sodium carbonate and 0 percent to 100 percent of the separated monohydrate crystallizer liquor containing soluble organic impurities is recycled to the monohydrate crystallizer for further monohydrate crystal recovery therefrom. The improvement comprises bleeding a portion of the monohydrate crystallizer liquor to maintain the concentration of the organic impurities in the monohydrate crystallizer below about 300 ppm carbon based on the sodium carbonate solution present in the monohydrate crystallizer, evaporating a portion of the bleed liquor at a temperature above about 109°C in an anhydrous crystallizer and crystallizing anhydrous sodium carbonate crystals, separating the anhydrous sodium carbonate crystals from the anhydrous crystallizer liquor, and drying the separated anhydorus sodium carbonate crystals to form high bulk density sodium carbonate.

An additional improved process of the invention involves combining the sodium carbonate monohydrate crystals and monohydrate crystallizer liquor with the anhydrous sodium carbonate crystals and anhydrous crystallizer liquor; separating a mixture of monohydrate and anhydrous sodium carbonate crystals from the combined monohydrate and anhydrous crystallizer liquor; and calcining the separated sodium carbonate crystals to form high bulk density sodium carbonate.

In the drawings,

FIG. I illustrates diagramatically one embodiment for the production of sodium carbonate from trona in which monohydrate crystallizer liquor purge streams are fed to an anhydrous crystallizer to recover anhydrous sodium carbonate crystals.

FIG. II illustrates a further modification of the process.

Figure 1:
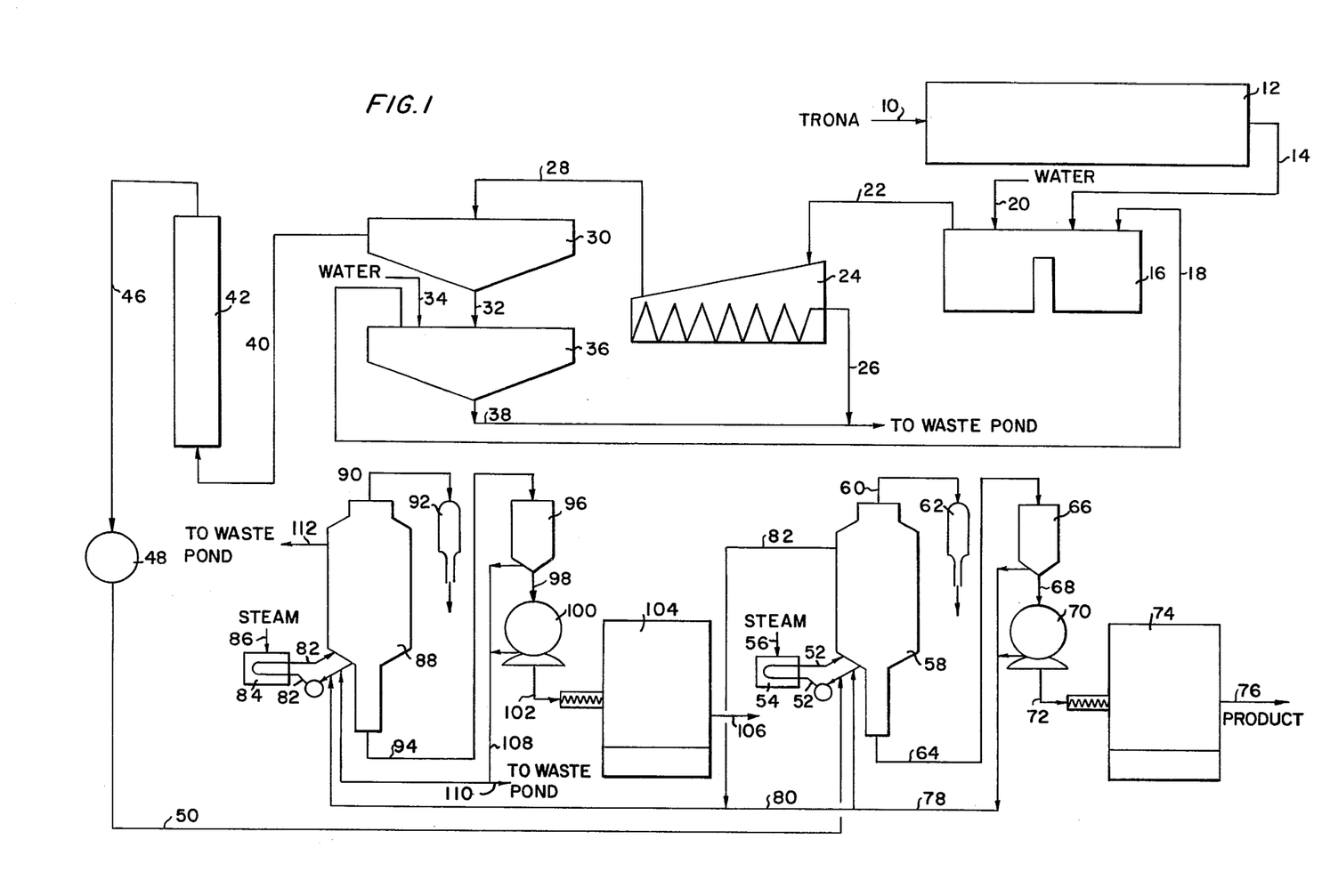
Figure 2:
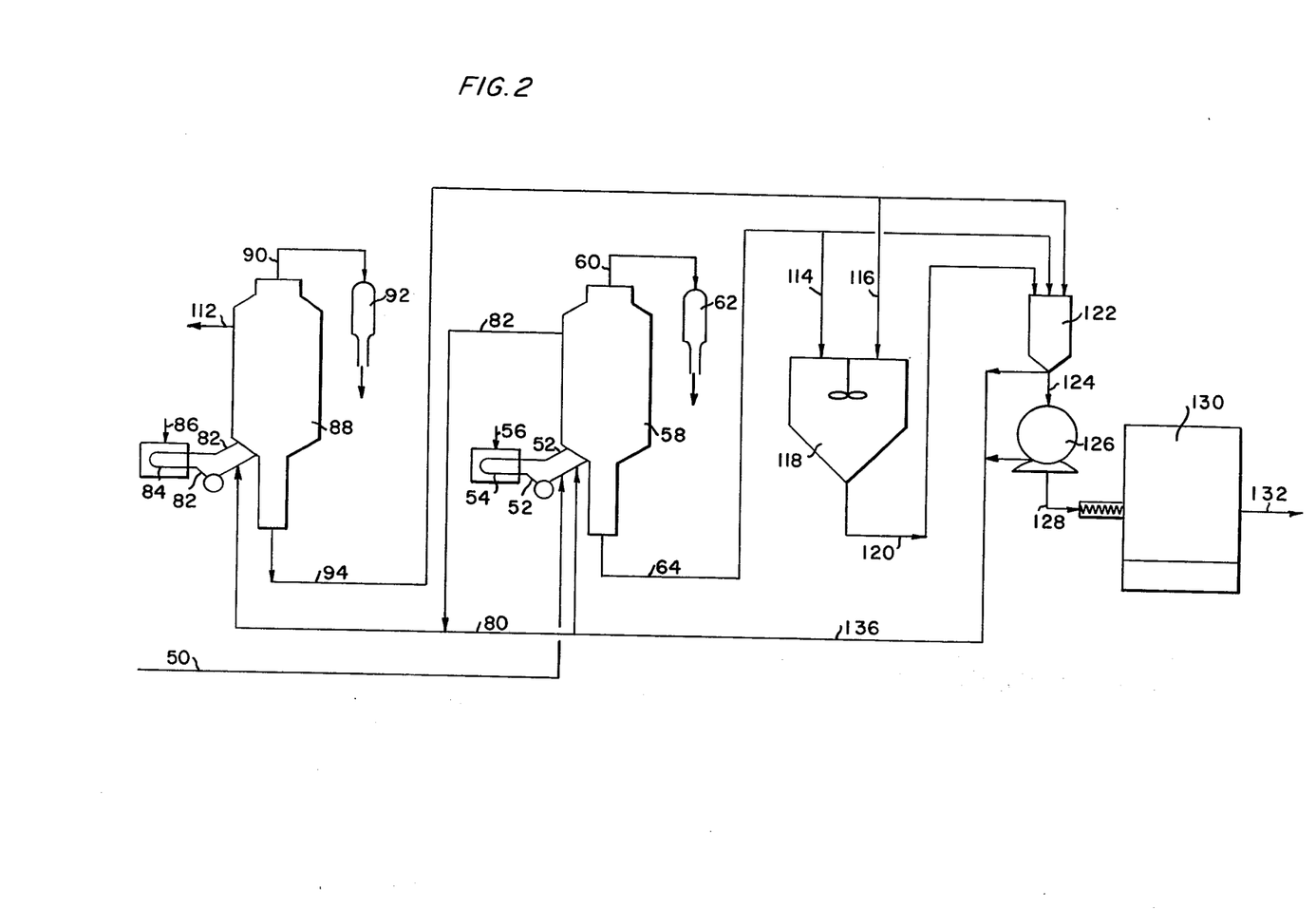

In the process of the invention crude trona is dry-mined and processed to crude sodium carbonate by calcining and converting the sodium sesquicarbonate present in the crude trona to sodium carbonate. This reaction may be presented as follows:

$$2(Na_2CO_3 \cdot NaHCO_3 \cdot 2H_2O) \rightarrow 3Na_2CO_3 + 5H_2O + CO_2$$

The crude dry-mined trona may be prepared for calcination by crushing the mined trona in a crushing apparatus and passing the crushed trona over a screening device or other suitable separating equipment. Particles in the general size range smaller than one inch are collected and passed to the calciner. Rejected oversize particles may then be recycled to the crushing apparatus for further crushing and screening. Proper sizing of the crude trona insures good conversion of the sodium sesquicarbonate therein to sodium carbonate, since over-sized particles are not easily converted in the calciner.

The calcination of crude trona has several advantages. First, the calcination effects a conversion of sodium bicarbonate values present in the crude trona to sodium carbonate. Second, the calcium salts and other difficulty soluble material in the insoluble fraction are rendered less soluble. Lastly, the crude sodium carbonate resulting from the calcination has a greater rate of solubility than the crude trona. The increase in the rate of solubility results in shorter dissolving time and in a great saving in the size of dissolving equipment so that high production rates of sodium carbonate can be obtained in smaller vessels. Additionally, the shorter dissolving time results in less dissolution of the calcium carbonate present in the insoluble fraction of the trona.

The calcination may be carried out at any temperature which is sufficient to convert the trona to sodium carbonate. Generally, calcination temperatures on the order of 150° to 800°C may be employed. If no organic-removal steps are to be used prior to evaporative crystallization of the sodium carbonate solution, calcination temperatures of about 400° to 800°C and preferably between 500° and 550°C are sufficient to convert the trona to sodium carbonate. If organic removal steps are to be utilized prior to evaporative crystallization, such as by carbon treatment, calcination temperatures on the order of 150° to 350°C, and preferably 150° to 170°C are employed.

The retention time of the crude trona in the calciner is a function of the ore particle size and the temperature of the calciner. At a temperature of 500° to 550°C, a period of about 15 minutes has been found satisfactory to obtain proper calcination of the crude trona. At a temperature of 150° to 170°C, a period of about 50 minutes has been found satisfactory.

The calcination is usually carried out in a rotary, direct fired calciner, although other type kilns or calciners, such as vertical kilns, grate type calciners, or fluid beds are equally suitable.

After the crude trona is calcined, it is passed to the dissolving area where hot water or a hot solution of sodium carbonate in water at any desired sodium carbonate concentration, is brought into contact with the crude sodium carbonate to form an aqueous solution of crude sodium carbonate. The water employed may be softened or partially softened water. In the preferred operation, the major quantity of liquid used for dissolving the crude calcined trona is recycle liquid from a subsequent stage of the process, for example, the thickener stage, and contains sodium carbonate values dissolved therein. It is also preferred that the liquid in the dissolver does not contain more than 170 ppm total hardness, expressed as calcium carbonate; this avoids the precipitation of calcium carbonate in the dissolvers. Calcium carbonate precipitation is most undesired because it forms scale which is difficult to remove.

When anhydrous sodium carbonate or calcined crude trona is introduced into water or into a solution of sodium carbonate in water at a temperature above 35°C and at or below 109°C it hydrates to sodium carbonate monohydrate. If the solution is unsaturated the sodium carbonate monohydrate dissolves. If the solution is saturated the sodium carbonate monohydrate does not dissolve.

The effluent from the dissolvers, which in the preferred process of this invention is a substantially saturated solution of sodium carbonate plus suspended insolubles and soluble organic impurities, is then passed to a coarse solids classifier. In the classifier the coarse insolubles or solids, having a particle size of about 40 mesh (U.S. Standard Sieve), are separated from the crude sodium carbonate solution which retains any undissolved or suspended insolubles smaller than about 40 mesh.

Any separator which separates coarse solids from the crude sodium carbonate may be employed. It is preferred to utilize a screw conveyor mounted in a liquid-tight, elongated container which container is mounted at an inclined angle. The inclined angle is measured from horizontal and may be from 10° to 60°. The positioning of the container in this manner permits the lower end of the screw to be covered with the crude sodium carbonate solution while permitting the upper end of the screw to extend out of the crude solution. Such a classifier is the Denver Equipment Company Spiral Classifier Model 125.

In the operation of the coarse solids classifier, the crude sodium carbonate solution from the dissolver is fed into the intake opening of the classifier. The coarse solids immediately sink to the bottom of the classifier because of their heavy weight relative to the crude solution. The screw picks up these heavier particles resting on the bottom of the classifier and conveys them upwardly out of the solution towards a discharge chute located at the top of the classifier. The suspended insolubles smaller than about 40 mesh, soluble organic impurities, and the sodium carbonate solution move to the lower end of the classifier where they are removed and passed to a clarifier.

By removing the large coarse particles in the classifier before the clarifier stage they are prevented from interfering with the clarifier operation.

The effluent from the coarse solids classifier is a substantially saturated solution of sodium carbonate containing suspended insolubles smaller than 40 mesh in size and soluble organic impurities. This effluent is passed to a clarifier where the suspended insolubles are permitted to settle out.

If a small amount of fine solid matter remains suspended in the sodium carbonate solution which has been treated in the clarifier, the sodium carbonate solution may be filtered to remove the remaining insolubles.

The overflow sodium carbonate solution from the clarifier, pregnant with sodium carbonate and containing approximately 50 to 200 ppm carbon as soluble organic impurities based on the sodium carbonate solution, may then be passed through a carbon column containing a packed bed of activated carbon. The carbon treatment represents the preferred method of operation and removes approximately 50 percent of the soluble organic impurities present in the sodium carbonate solution.

The carbon-treated sodium carbonate solution is then passed to a monohydrate crystallizer having an evaporating and crystallizing stage where water is evaporated from the sodium carbonate solution and sodium carbonate monohydrate is crystallized from the solution.

In the typical crystallizing operation, the carbonate solution is passed through a series of evaporators, specifically multiple effect evaporative crystallizers. The sodium carbonate solution generally first enters the crystallizer operated at the highest temperature and then passes in the form of a slurry through the remaining crystallizers, each succeeding one being operated at a lower temperature than the previous one. The crystallizers are operated at temperatures of about 100°C, 75°C and 50°C respectively when three crystallizers are employed.

As the sodium carbonate solution passes through the crystallizers, a slurry of sodium carbonate monohydrate crystals and monohydrate crystallizer liquor is formed. From the crystallizers the slurry is passed to a concentrator where the slurry is treated to remove most of the monohydrate crystallizer liquor remaining on the sodium carbonate monohydrate crystals. The moist sodium carbonate monohydrate crystals are then passed to a centrifuge to remove essentially all of the remaining monohydrate crystallizer liquor. Thereafter the crystals are heated in a dryer at a temperature of about 105° to about 130°C to convert the sodium carbonate monohydrate crystals to anhydrous sodium carbonate.

The monohydrate crystallizer liquor separated from the sodium carbonate monohydrate crystals in the concentrator and centrifuge contains approximately 30 percent dissolved sodium carbonate, and constitutes up to 30 percent of the clarified sodium carbonate solution passed to the monohydrate crystallizer. In order to recover some of the sodium carbonate values from the monohydrate crystallizer liquor, a portion of the monohydrate crystallizer liquor is recycled to one or more monohydrate crystallizers and combined with clarified sodium carbonate feed solution. The amount of monohydrate crystallizer liquor recycled ranges from 0 percent to 100 percent of the monohydrate crystallizer liquor. Since the recycled monohydrate crystallizer liquor contains concentrated amounts of organic impurities which will build-up after a number of recycles, a portion of the monohydrate crystallizer liquor is bled from the system to prevent build-up of impurities.

A portion of the monohydrate crystallizer liquor may be bled directly from one or more monohydrate crystallizers or from the monohydrate crystallizer recycle liquor. It is preferable, however, to bleed the monohydrate crystallizer recycle liquor since the sodium carbonate monohydrate crystals have been removed from this liquor whereas liquor bled from the crystallizer still contains recoverable monohydrate crystals. In a commercially operating monohydrate process which employs three monohydrate evaporative crystallizers, bleeding of the crystallizers should be done in a manner which removes the liquor containing the highest concentration of organic impurities.

Bleeding may be done continuously or periodically when necessary, that is, when an unacceptably high concentration of organic impurities is present in the monohydrate crystallizer liquor. The monohydrate crystallizer liquor is preferably continuously bled in the amount of 1 percent to 25 percent, and preferably 3 percent to 10 percent, of the total sodium carbonate introduced into the process. Bleeding the monohydrate crystallizer liquor in this manner assures that the organic carbon concentrations in the monohydrate crystallizer liquor present in the monohydrate crystallizer do not exceed about 300 ppm carbon, and are preferably not above 200 ppm carbon. Higher amounts of bleeds may be employed when necessary.

In accordance with the present invention, the monohydrate crystallizer liquor bleed is then passed to an anhydrous crystallizer having an evaporating and crystallizing stage where water is evaporated from the liquor and anhydrous sodium carbonate is crystallized from the solution.

In the crystallizing operation, the bled monohydrate crystallizer liquor is passed through an anhydrous evaporator, or series of anhydrous evaporators operated at a temperature from at least the transition temperature at which crystalline anhydrous sodium carbonate is formed. This transition temperature is above about 109°C. Temperatures above, but close to the transition temperature are preferable to much higher temperatures because the former temperatures avoid the high pressures that must accompany higher temperatures. Good results have been obtained at temperatures from about 110° to about 130°C with best results being obtained at temperatures from about 117° to about 126°C. These temperatures may be achieved at pressures from about 16.9 to about 33.7 p.s.i.a. and from about 20.7 to about 29.7 p.s.i.a. respectively.

As the liquor passes through the anhydrous crystallizer, a slurry of anhydrous sodium carbonate crystals forms in the anhydrous crystallizer. From the crystallizer the slurry is passed to a concentrator where the slurry is treated to remove most of the anhydrous crystallizer liquor remaining on the anhydrous sodium carbonate crystals. The moist anhydrous sodium carbonate crystals are then passed to a centrifuge to remove essentially all of the remaining anhydrous crystallizer liquor. Thereafter, the crystals are dried in a dryer at conventional drying temperatures, preferably between about 105° and about 130°C.

The anhydrous crystallizer liquor separated from the anhydrous sodium carbonate crystals in the concentrator and centrifuge contains approximately 30 percent dissolved sodium carbonate and constitutes up to 10 percent of the clarified sodium carbonate solution feed to the monohydrate crystallizer.

Some of the sodium carbonate values in the anhydrous crystallizer liquor can be recovered from this liquor by recycling a portion of the separated anhydrous crystallizer liquor to the anhydrous crystallizer. The amount of the anhydrous crystallizer liquor recycled ranges from 0 percent to 100 percent of the separated anhydrous crystallizer liquor. However, since the recycled anhydrous crystallizer liquor contains extremely high concentrations of soluble organic impurities which will continually build-up after a number of recycles, a portion of the anhydrous crystallizer liquor is purged from the system.

Purging of the anhydrous crystallizer liquor may be directly from the anhydrous crystallizer or from the anhydrous crystallizer recycle liquor. It is preferable, however, to purge the anhydrous crystallizer recycle liquor since the sodium carbonate crystals are removed from the liquor prior to purging whereas liquor purged from the crystallizer still contains recoverable anhydrous crystals. Purging may be done continuously or periodically when necessary, that is, when an unacceptably high concentration of soluble organic impurities is present in the anhydrous crystallizer liquor. Since the purge streams contain extremely high amounts of organic impurities which render them useless for further processing, the anhydrous crystallizer purge streams are discarded as waste.

The anhydrous crystallizer liquor is generally purged in the amount of 1 percent to 25 percent, and preferably 3 percent to 10 percent, of the total sodium carbonate introduced into the process in order to maintain the organic impurity concentration in the anhydrous crystallizer below about 4,000 ppm carbon based on the sodium carbonate solution. Preferably, the organic impurity concentration in the anhydrous crystallizer is maintained below about 900 ppm carbon. The anhydrous sodium carbonate crystal quality is substantially reduced when the crystals are formed in the presence of more than 4,000 ppm carbon. Larger amounts of purges may be employed when necessary.

By employing the procedure of this invention approximately 50 percent of the sodium carbonate present in the monohydrate crystallizer bleed liquor, which formally was purged and discarded, can be recovered as saleable sodium carbonate. This amount of sodium carbonate can account for as much as 15 percent of the total sodium carbonate introduced into the monohydrate process. Furthermore, the anhydrous sodium carbonate crystals produced according to this invention have high bulk densities, that is, from 60 to 80 lbs/ft$^3$; excellent particle densities of around 2.45 g/cc; and resist breakage through handling. The formation of crystalline anhydrous products from monohydrate waste products containing sodium carbonate values is highly unexpected.

By employing an anhydrous sodium carbonate crystallization process with a monohydrate process for producing sodium carbonate additional advantages in the monohydrate process are obtained. The monohydrate process is more economical since approximately 50 percent of the carbonate values previously discarded as waste are recovered as saleable sodium carbonate. Finally, the invention permits the formation of an improved quality sodium carbonate product without the need for lowering crystal production rates.

An optional step which may be employed in the invention is to combine the monohydrate crystallizer slurry, containing sodium carbonate monohydrate crystals and monohydrate crystallizer liquor, with the anhydrous crystallizer slurry, containing anhydrous sodium carbonate crystals and anhydrous crystallizer liquor, prior to their individual separations. This combined slurry is then passed to a concentrator where the slurry is treated to remove most of the monohydrate and anhydrous crystallizer liquors remaining on the monohydrate and anhydrous sodium carbonate crystals. The moist crystals are then passed to a centrifuge to remove essentially all of the remaining liquor. Thereafter the crystals are heated in a dryer at a temperature from about 105° to about 130°C to dry the anhydrous sodium carbonate crystals and to convert the sodium carbonate monohydrate crystals to anhydrous sodium carbonate. The separated crystallizer liquor is recycled as the monohydrate crystallizer liquor discussed above.

The monohydrate crystallizer slurry may be combined with the anhydrous crystallizer slurry either simultaneously in the concentrator or prior to the concentrator. In either case, the anhydrous crystallizer slurry is cooled to around 85°C prior to centrifugation, which temperature is below the transition temperature of the anhydrous sodium carbonate crystals. It has been unexpectedly discovered, however, that inversion of less than 50 percent of the anhydrous sodium carbonate crystals to monohydrate crystals occur within 15 to 108 minutes at these temperatures. The inversion rate appears to depend upon the original anhydrous crystal sizing and upon whether the anhydrous slurry is mixed with the monohydrate slurry or separately passed into the concentrator. Inversion occurs most rapidly when the slurries are mixed prior to concentration. The inversion problem, however, is obviated by removing the liquor from the anhydrous slurry either with or without prior mixing with the monohydrate slurry, within 0.5 and 1.5 minutes from the time the temperature of the anhydrous slurry drops below the transition temperature.

The monohydrate and anhydrous slurries may be combined in any proportion, but are preferably combined in the weight ratios they are produced. For example, when employing three monohydrate crystallizers and one anhydrous crystallizer, the slurries are combined in a 3:1 weight ratio respectively. The properties of the resulting product depends upon the properties of the monohydrate and anhydrous crystal properties. Generally, the resulting product properties i.e., bulk density, particle size distribution, are an arithmetic average of the weight ratios of the crystal mixture.

This optional step is advantageous in that it permits the recovery of a sodium carbonate product with bulk densities and sizing higher than could be previously produced from the monohydrate process alone. It is also advantageous in that it eliminates the need for separate means for concentrating and centrifuging the separate crystals.

Referring now to the drawings.

FIG. I illustrates diagrammatically one embodiment of the invention for the production of sodium carbonate from calcined trona.

FIG. II illustrates diagrammatically an embodiment of the invention in which the monohydrate sodium carbonate crystal slurry is combined with the anhydrous sodium carbonate crystal slurry to produce a mixed high bulk density product.

In FIG. 1 the crude trona, crushed to a general size range of less than one inch is fed by conduit 10 to a calciner 12 where the crude trona is converted to crude sodium carbonate by heating at elevated temperatures. The gaseous products of reaction, namely water and $CO_2$, are removed from the calciner and vented by means not shown.

The crude sodium carbonate recovered from calciner 12, with or without cooling, is passed through conduit 14 to dissolver 16 where the sodium carbonate is dissolved in hot dissolver influent liquor to form a substantially saturated solution of sodium carbonate. The influent liquor may be water, preferably softened water supplied through conduit 20, and recycled solution supplied through conduit 18 from thickener 36. The temperature of the dissolver liquor is generally on the order of 85° to 95°C.

The crude sodium carbonate solution formed in dissolver 16 which contains suspended insolubles and soluble organic impurities is removed through conduit 22 and passes into a coarse solids classifier 24. In classifier 24 the coarse insolubles or solids, that is solids of at least about 40 mesh, fall to the bottom of the classifier and are passed upwardly by means of the revolving screw in the classifier. The sodium carbonate solution containing the organic impurities and the finer particles, that is particles having a size smaller than about 40 mesh, flow towards the base of the classifer and are removed through conduit 28 and passed to a clarifier 30. The coarse solids are removed from the liquid layer through conduit 26 and sent to waste.

In clarifier 30 the sodium carbonate solution, free of coarse solids, remains in a substantially quiescent state. The insoluble fines settle and form a sludge at the bottom of the clarifier. The sludge is removed by a rotating rake and passed to a thickener 36 through conduit 32. Makeup water may be added through conduit 34 and mixed with the sludge from clarifier 30 in thickener 36 to soften the makeup water. The insolbue fines settle in thickener 36 and are removed by conduit 38 to waste. Water which has been softened and which contains sodium carbonate values, is then removed from thickener 36 and passed through conduit 18 to dissolver 16 for use in dissolving crude sodium carbonate.

The relatively clear solution that overflows from clarifier 30 through conduit 40 is passed through a filter (now shown) and into a carbon absorption column 42 to remove a substantial portion of the soluble organic impurities. The carbon-treated sodium carbonate solution is then passed through conduit 46 into filter 48 to remove any additional fines or carbon particles.

The clarified sodium carbonate solution is passed through conduit 50 into a monohydrate crystallizer 58. The sodium carbonate solution enters a recycle circuit 52 which flows into a heat exchanger 54, for heating solution passing through exchanger 54. The heat exchanger 54 is supplied with steam 56 in order to heat the solution circulating in recycle circuit 52. The heated solution is then passed into monohydrate crystallizer 58 where a portion of the water is evaporated and removed through conduit 60. As a result of the evaporation, sodium carbonate monohydrate is crystallized and the crystal slurry containing sodium carbonate monohydrate crystals and monohydrate crystallizer liquor is removed through conduit 64. The water removed through conduit 60 may be condensed in condenser 62 and piped to cooling towers or can be used as softened makeup water, as desired.

The sodium carbonate monohydrate crystal slurry removed through conduit 64 is passed into concentrator 66 to remove the bulk of the monohydrate crystallizer liquor remaining on the sodium carbonate monohydrate crystals. The concentrated monohydrate crystal slurry is removed from concentrator 66 through conduit 68 and passed into centrifuge 70 where all, but very small amounts, on the order of 3 percent of the monohydrate crystallizer liquor is removed from the sodium carbonate monohydrate crystals. The centrifuged sodium carbonate monohydrate crystals are removed from centrifuge 70 through conduit 72 and passed into dryer 74 where the sodium carbonate monohydrate crystals are converted to anhydrous sodium carbonate and removed through conduit 76 as product. The dryer 74 is heated at a temperature sufficient to convert the sodium carbonate monohydrate crystals to anhydrous sodium carbonate, for example, at temperatures from about 105° to about 130°C. As a result of converting the sodium carbonate monohydrate crystals to anhydrous sodium carbonate the resulting product is recovered as a high density material having a bulk density of about 6 lb/ft$^3$.

The monohydrate crystallizer liquor removed from concentrator 66 and centrifuge 70 are combined and recycled through conduit 78 to monohydrate crystallizer 58 where the recycle liquor is combined with clarified sodium carbonate feed solution.

A portion of the monohydrate crystallizer liquor is bled from the system from conduit 78 through conduit 80 and/or from monohydrate crystallizer 58 through conduit 82 and passed through conduit 80 into an anhydrous crystallizer 88. The bleed liquor enters anhydrous crystallizer 88 through a recycle circuit 82 which flows into a heat exchange 84 for heating liquor passing through exchanger 84. The heat exchanger 84 is supplied with steam 86 in order to heat the liquor circulating in recycle circuit 82. The heated solution is then passed into anhydrous crystallizer 88 where a portion of the water is evaporated and removed through conduit 90. As a result of the evaporation, anhydrous sodium carbonate is crystallized and the crystal slurry containing anhydrous sodium carbonate crystals and anhydrous crystallizer liquor is formed and removed through conduit 94. A back-pressure is maintained on the boil off vapors from anhydrous crystallizer 88 in any desired manner. Preferably, the back-pressure is maintained in conduit 90 which contains the removed water vapors. The water removed through conduit 90 may be condensed in condenser 92 and piped to cooling towers or can be used as softened makeup water, as desired.

The anhydrous sodium carbonate crystal slurry removed through conduit 94 is passed into concentrator 96 to remove the bulk of the anhydrous crystallizer liquor remaining on the anhydrous sodium carbonate crystals. The concentrated anhydrous sodium carbonate crystal slurry is removed from concentrator 96 through conduit 98 and passed into centrifuge 100 where all, but very small amounts, on the order of 3 percent of the anhydrous crystallizer liquor, is removed from the anhydrous sodium carbonate crystals. The centrifuged anhydrous sodium carbonate crystals are removed from centrifuge 100 through conduit 102 and passed into dryer 104 where the anhydrous sodium carbonate crystals are dried, and removed through conduit 106 as product. The resulting anhydrous sodium carbonate product is recovered as a high density material having a bulk density from about 60 to about 80 lbs/ft$^3$.

The anhydrous crystallizer liquor removed from concentrator 96 and centrifuge 100 are combined and recycled through conduit 108 to the anhydrous crystallizer 88 where the recycled liquor is combined with the bleed monohydrate crystallizer liquor.

A portion of the anhydrous crystallizer liquor is purged from the system through conduit 108, through conduit 110 and/or from the anhydrous crystallizer 88 through conduit 112 and sent to waste.

In FIG. II, clarified sodium carbonate solution produced according to FIG. I is passed through conduit 50 into monohydrate crystallizer 58 by passing the solution through recycle circuit 52, heat exchange 54 supplied with steam 56. The monohydrate sodium carbonate crystal slurry produced in monohydrate crystallizer 58 is removed through conduit 64 and passed into concentrator 122 along with the anhydrous sodium carbonate crystal slurry produced in anhydrous crystallizer 88 and removed through conduit 94. Alternatively, the monohydrate sodium carbonate crystal slurry removed through conduit 64 from monohydrate crystallizer 58 is passed into mixing vessel 118 through conduit 114 and mixed with the anhydrous sodium carbonate crystal slurry removed through conduit 94 from anhydrous crystallizer 88 and passed into mixing vessel 118 through conduit 116. The slurries are agitated in the mixing vessel by conventional means and are passed through conduit 120 into concentrator 122. In concentrator 122 the bulk of the monohydrate and anhydrous crystallizer liquors are removed from the monohydrate and anhydrous sodium carbonate crystals. The concentrated monohydrate and anhydrous crystal slurry is removed from concentrator 122 through conduit 124 and passed into centrifuge 126 where all but very small amounts, on the order of 3 percent of the combined crystallizer liquors is removed from the mixed monohydrate and anhydrous sodium carbonate crystals. The centrifuged monohydrate and anhydrous sodium carbonate crystals are removed from centrifuge 126 through conduit 128 and passed into dryer 130 where the anhydrous sodium carbonate crystals are dried and the sodium carbonate monohydrate crystals are converted to anhydrous sodium carbonate. The dried product is then removed through conduit 132 as product. The drier 130 is preferably heated at temperatures from about 105° to about 130°C. The drier 130 may be in the form of a fluid-bed dryer, rotary kiln dryer or the like.

The crystallizer liquors removed from concentrator 122 and centrifuge 126 were combined and recycled through conduit 136 to monohydrate crystallizer 58 where the recycle liquor is combined with clarified sodium carbonate in solution. The crystallizer liquors flowing through conduit 136 are bled through conduit 80 as in FIG. I.

The following examples are given to illustrate the invention, but are not deemed to be limiting thereof. All percentages given are based upon weight unless otherwise indicated.

EXAMPLE 1

Anhydrous Sodium Carbonate Crystallization

A clarified and filtered saturated solution of crude sodium carbonate (30 percent $Na_2CO_3$) containing 70 to 100 ppm carbon based on the sodium carbonate solution was prepared by dissolving calcined trona ore, calcined at 200°C and containing about 10 percent by weight insoluble matter, in 85°C distilled $H_2O$. After agitating and settling the solution, the solution was filtered to remove a substantial portion of the suspended insolubles smaller than about 40 mesh. The crude solution was poured into a vessel and heated at 105°C at one atmosphere pressure, and water was evaporated from the solution until the solution contained 417 ppm carbon. The solution was then decanted and filtered to remove sodium carbonate monohydrate crystals.

A stainless steel laboratory crystallizer was then filled with 4100 ml of the decanted saturated sodium carbonate solution. The solution was then seeded with 5 to 50 grams of sodium carbonate crystals. The slurry density was adjusted to 25 weight percent solids by evaporating water at 126°C. During this period an equivalent amount of decanted and filtered saturated sodium carbonate solution was fed into the crystallizer. The crystallizer was then stabilized at a temperature of 126°C and a pressure of 29.7 p.s.i.a. After the crystallizer was stabilized, a water evaporation rate of 20 ml/min was maintained and 110 ml of the 25 weight percent slurry was withdrawn from the crystallizer every 5 min. The crystallizer was now fed fresh solution by recycling 100 ml of the evaporated water and 110 ml of the removed slurry back into the crystallizer to establish steady state condition. This recycling procedure was carried out in continuous fashion for a running time of 12 hours. At the end of this period, the entire contents of the crystallizer were drained. The slurry was then centrifuged and the anhydrous sodium carbonate crystals were dried. Analysis of the anhydrous crystallizer liquor for ppm carbon and the anhydrous sodium carbonate crystal product were then made. The results are given in Table I.

EXAMPLE 2

Anhydrous Sodium Carbonate Crystallization

The procedure of Example 1 was repeated with a crude sodium carbonate solution containing 165 ppm carbon except that the crystallizer running time was 14 hours. The crude sodium carbonate solution was prepared by adding a sodium carbonate (reagent grade) solution containing 30 percent sodium carbonate to the decanted and filtered sodium carbonate solution containing 417 ppm carbon prepared in Example 1 until the organic impurity concentration was 165 ppm carbon. Analysis of the anhydrous crystallizer liquor for ppm carbon and the anhydrous sodium carbonate crystal product were then made. The results are given in Table I.

EXAMPLE 3

Anhydrous Sodium Carbonate Crystallization

The procedure of Example 1 was repeated, except the crystallizer was maintained at a temperature of 117°C and at a pressure of 21.7 p.s.i.a. and except that after the steady state condition of the crystallizer was formed, less than 100 ml of the evaporated water was recycled. This procedure was carried out in continuous fashion until the anhydrous crystallizer liquor contained 3,280 ppm carbon. Analysis of the anhydrous sodium carbonate crystal product was then made. The results are given in Table I.

EXAMPLE A

Sodium Carbonate Monohydrate Crystallization

A clarified and filtered saturated solution of crude sodium carbonate (30 percent $Na_2CO_3$) containing 50 ppm carbon based on the sodium carbonate solution was prepared by dissolving calcined trona ore, calcined at 175°C and containing about 10 percent by weight insoluble matter, in 85°C distilled water. After agitating and settling the solution, the solution was filtered to remove a substantial portion of the suspended insolubles smaller than about 40 mesh and passed through a 12 feet long by 2 inch diameter packed bed of activated granular carbon maintained at 75°C. The carbon-treated solution was poured into a vessel and heated at 105°C and at atmospheric pressure. The water was evaporated from the solution until the solution contained 424 ppm carbon. The solution was then decanted and filtered to remove sodium carbonate monohydrate crystals.

A stainless steel laboratory crystallizer was then filled with 4100 ml of the decanted saturated sodium carbonate solution. The solution was then seeded with 50 grams of sodium carbonate monohydrate crystals and the slurry density adjusted to 33 weight percent solids by evaporating water at 105°C. After the desired slurry density was attained, the crystallizer was stabilized at a temperature of 105°C and at one atmosphere pressure, a water evaporation rate of 15 ml/min was maintained and slurry was withdrawn from the crystallizer at a constant ratio of slurry to water of 100 ml water to 113 ml slurry. This procedure was carried out in continuous fashion for a running time of 13 hours. At the end of this period, the contents of the crystallizer were drained. The slurry was then centrifuged and the sodium carbonate monohydrate crystals were dried to anhydrous crystals at 110°C. Analysis of the crystallizer liquor for ppm carbon and the sodium carbonate monohydrate crystal product were then made. The results are given in Table I.

EXAMPLE B

Sodium Carbonate Monohydrate Crystallization

The procedure of Example A was repeated with a crude sodium carbonate solution containing 178 ppm carbon. The crude sodium carbonate solution was prepared by passing crude sodium carbonate solution containing 424 ppm carbon produced by the procedure of Example A through a 15 foot long by 2 inch diameter packed bed of activated granular carbon maintained at 75°C. Analysis of the crystallizer liquor for ppm carbon and the sodium carbonate crystal product were then made. The results are given in Table I.

TABLE I

| Description | 1 | 2 | 3 | A | B |
|---|---|---|---|---|---|
| Crystallizer Liquor ppm Carbon | 876 | 346 | 3,280 | 890 | 374 |
| Crystal Properties | | | | | |
| Bulk Density (lbs/ft³) | 75 | 74 | 63 | 58.8 | 62.5 |
| Appearance | very good — blocky, some twins and agglomerates | excellent — blocky, few twins and agglomerates | good — some twins and agglomerates | very poor — cigar shape & agglomerates | fair — long in b axis |
| Loss on Ignition wt.% | 0.4 | <0.1 | 0.7 | 14.5 | 14.1 |
| Particle size distribution in percent | | | | | |
| +30 | 0.3 | 0 | 0.5 | 0.6 | 0.4 |
| +40 | 5 | 5 | 4 | 6 | 18 |
| +50 | 23 | 31 | 19 | 27 | 45 |
| +70 | 75 | 68 | 67 | 61 | 72 |
| +100 | 96 | 72 | 87 | 85 | 88 |
| −100 | 4 | 28 | 13 | 15 | 12 |
| Particle Density g/cc | 2.45 | 2.45 | 2.45 | 1.90 | 1.90 |

EXAMPLE 4

A slurry of anhydrous sodium carbonate was prepared according to Example 1. After the anhydrous crystallizer attained steady state conditions, the slurry was withdrawn from the crystallizer and immediately mixed with a sodium carbonate monohydrate slurry containing 33 weight percent solids prepared according to Example A. The slurries were mixed in a weight ratio of 3 parts monohydrate slurry to 1 part anhydrous slurry. The mixed slurries were then agitated at 85°C and atmospheric pressure for 10 minutes. Samples of the mixed slurry were removed at given time intervals and analyzed for the percentage of anhydrous inversion to monohydrate. Afer one minute of mixing, less than 5 percent of the anhydrous crystals inverted, and only 50 percent inversion was noted after 10 minutes.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In the process of producing high bulk density sodium carbonate from crude trona, crude trona is calcined at a temperature and for a time sufficient to convert the crude trona into crude sodium carbonate, the crude sodium carbonate is dissolved in water to form an aqueous solution of crude sodium carbonate containing suspended insolubles and soluble organic impurities, the coarse suspended insolubles are separated from the crude sodium carbonate solution, the crude sodium carbonate solution is clarified and treated to remove a substantial portion of the remaining suspended insolubles and soluble organic impurities from the crude sodium carbonate solution, a portion of water from the clarified sodium carbonate solution is evaporated in a monhydrate crystallizer and sodium carbonate monohydrate crystals are formed, the sodium carbonate monohydrate crystals are then separated from the monohydrate crystallizer liquuor containing organic impurities, and the separated sodium carbonate monohydrate crystals are calcined to form dense sodium carbonate and 0 percent to 100 percent of the separated monohydrate crystallizer liquor containing organic impurities is recycled to the monohydrate crystallizer for further monohydrate crystal recovery therefrom, wherein the improvement comprises: bleeding a portion of the monohydrate crystallizer liquor to maintain the concentration of the organic impurities in the monohydrate crystallizer below about 300 ppm carbon based on the sodium carbonate solution present in the monohydrate crystallizer, evaporating a portion of the bleed liquor at a temperature above about 109°C in an anhydrous crystallizer and crystallizing anhydrous sodium carbonate crystals, purging a portion of the anhydrous crystallizer liquor to maintain the concentration of the organic impurities in the anhydrous crystallizer below 4,000 ppm carbon based on the sodium carbonate solution present in the anhydrous crystallizer, separating the anhydrous sodium carbonate crystals from the anhydrous crystallizer liquor, and drying the separated anhydrous sodium carbonate crystals to form high bulk density sodium carbonate.

2. The process of claim 1 including, recycling a portion of the separated anhydrous crystallizer liquor to the anhydrous crystallizer for further recovery of anhydrous crystals.

3. The process of claim 1 including, combining the sodium carbonate monohydrate crystals and monohydrate crystallizer liquor with the anhydrous sodium carbonate crystals and anhydrous crystallizer liquor, separating the monohydrate and anhydrous sodium carbonate crystals from the combined monohydrate and anhydrous crystallizer liquors, and calcining the separated sodium carbonate crystals to form dense sodium carbonate.

4. The process of claim 3, including recycling 0 percent to 100 percent of the separated crystallizer liquors to the monohydrate crystallizer.

5. The process of claim 1 wherein the temperature of the anhydrous crystallizer liquor in the anhydrous crystallizer is maintained at temperatures from about 110°C to about 130°C.

6. The process of claim 1 wherein the temperature of the anhydrous crystallizer liquor in the anhydrous crystallizer is maintained at temperatures from about 117°C to about 126°C.

7. In the process of producing high bulk density sodium carbonate from crude trona, crude trona is calcined at a temperature and for a time sufficient to convert the crude trona into crude sodium carbonate; the crude sodium carbonate is dissolved in water to form an aqueous solution of crude sodium carbonate containing suspended insolubles and soluble organic impurities; the coarse suspended insolubles are separated from the crude sodium carbonate solution; the crude sodium carbonate solution is clarified and treated to remove a substantial portion of the remaining suspended insolubles and soluble organic impurities from the crude sodium carbonate solution; a portion of water is evaporated from the clarified sodium carbonate solution in a monohydrate crystallizer and sodium carbonate monohydrate crystals are formed; the sodium carbonate monohydrate crystals are then separated from the monohydrate crystallizer liquor containing organic impurities; and the separated sodium carbonate monohydrate crystals are calcined to form dense sodium carbonate and 0 percent to 100 percent of the separated monohydrate crystallizer liquor containing organic impurities is recycled to the monohydrate crystallizer for further monohydrate crystal recovery therefrom; wherein the improvement comprises: bleeding a portion of the monohydrate crystallizer liquor to maintain the concentration of the organic impurities in the monohydrate crystallizer below about 300 ppm carbon based on the sodium carbonate solution present in the monohydrate crystallizer; passing the bleed liquor to an anhydrous crystallizer; maintaining the temperature of the liquor in the anhydrous crystallizer from about 117°C to about 126°C at pressures from about 20.7 p.s.i.a. to about 29.7 p.s.i.a.; evaporating a portion of the liquor and crystallizing anhydrous sodium carbonate crystals; separating the anhydrous sodium carbonate crystals from the anhydrous crystallizer liquor; drying the separated anhydrous sodium carbonate crystals to form high bulk density sodium carbonate and recycling 0 percent to 100 percent of the separated anhydrous crystallizer liquor to the anhydrous crystallizer for further anhydrous crystal recovery therefrom; and purging a portion of the anhydrous crystallizer liquor to maintain the concentration of the organic impurities in the anhydrous crystallizer below about 4,000 ppm carbon based on the sodium carbonate solution present in the anhydrous crystallizer.

* * * * *

UNITED STATES PATENT OFFICE
CERTIFICATE OF CORRECTION

PATENT NO. : 3,933,977
DATED : January 20, 1976
INVENTOR(S) : Joseph M. Ilardi; John Walden; Eric Rau It is certified that error appears in the above-identified patent and that said Letters Patent are hereby corrected as shown below:

Column 3, line 11, "anhydorus" should read --anhydrous--.

Column 4, line 55, "carbonate may be employed" should read --carbonate solution may be employed--.

Column 8, line 41, "occur" should read --occurs--.

Column 9, line 51, "insolbue" should read --insoluble--.

Column 9, line 59, "(now shown)" should read --(not shown)--.

Column 10, line 36, "6 lb/ft$^3$" should read --60 lb/ft$^3$--.

Column 12, line 36, "and a pressure" should read --and at a pressure--.

Column 15, line 4, "monhydrate" should read --monohydrate--.

Column 15, line 7, "liquuor" should read --liquor--.

Signed and Sealed this

Twenty-first Day of September 1976

[SEAL]

Attest:

RUTH C. MASON
*Attesting Officer*

C. MARSHALL DANN
*Commissioner of Patents and Trademarks*